April 14, 1942.  H. V. KINDSETH  2,279,328
BAG CLOSING AND SEALING MACHINE
Filed June 22, 1939  8 Sheets-Sheet 1

INVENTOR
HAROLD V. KINDSETH

ATTORNEYS

April 14, 1942.  H. V. KINDSETH  2,279,328
BAG CLOSING AND SEALING MACHINE
Filed June 22, 1939  8 Sheets-Sheet 2

INVENTOR
HAROLD V. KINDSETH
By Paul, Paul Moore Piers
ATTORNEYS

April 14, 1942.  H. V. KINDSETH  2,279,328
BAG CLOSING AND SEALING MACHINE
Filed June 22, 1939   8 Sheets-Sheet 3

INVENTOR
HAROLD V. KINDSETH
ATTORNEYS

April 14, 1942.　　H. V. KINDSETH　　2,279,328
BAG CLOSING AND SEALING MACHINE
Filed June 22, 1939　　8 Sheets-Sheet 4
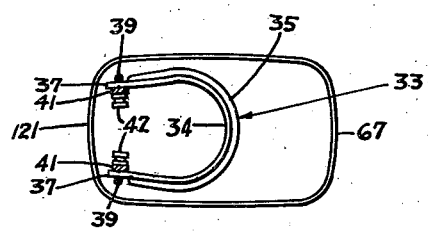
FIG.10
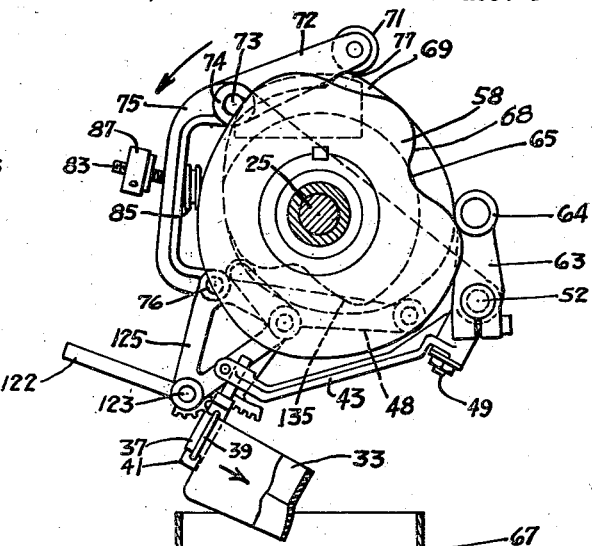
FIG.13
FIG.12
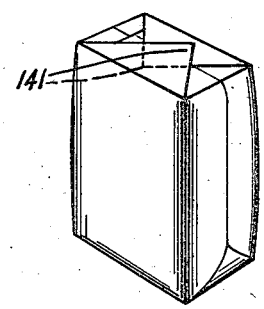
FIG.22
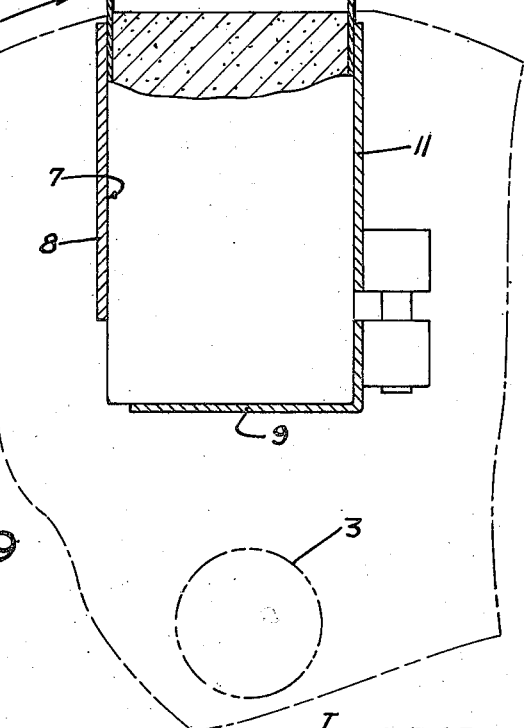
FIG.9
INVENTOR
HAROLD V. KINDSETH
By Paul, Paul Marx Sierra
ATTORNEYS April 14, 1942.  H. V. KINDSETH  2,279,328
BAG CLOSING AND SEALING MACHINE
Filed June 22, 1939  8 Sheets-Sheet 5
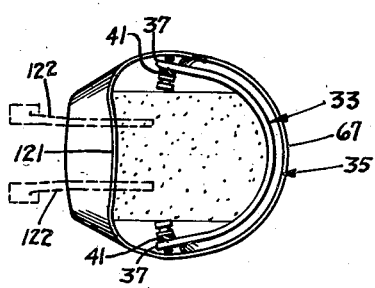
Fig. 11
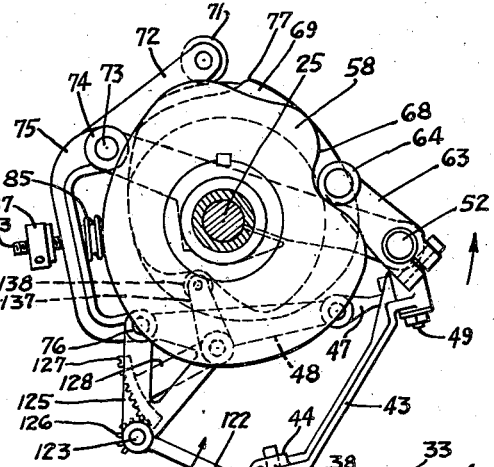
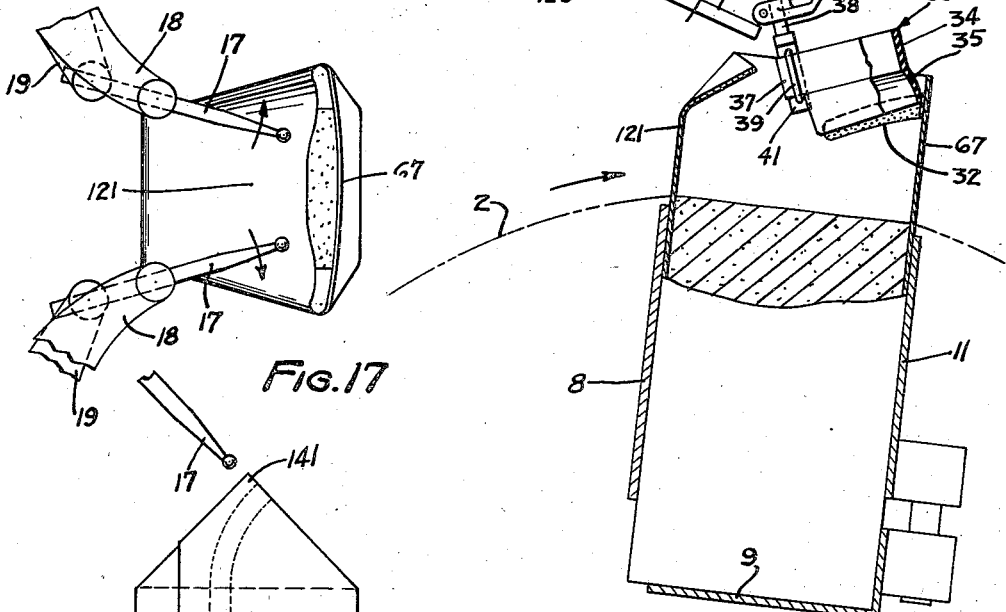
Fig. 17
Fig. 14
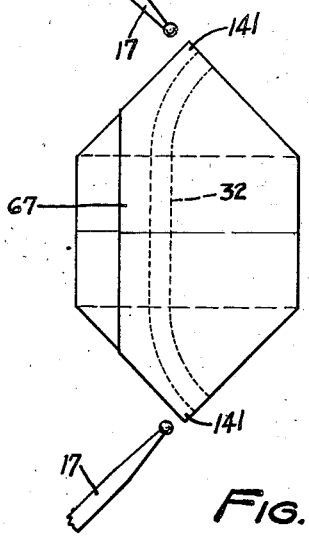
Fig. 18
INVENTOR
HAROLD V. KINDSETH
By Paul, Paul Moore
ATTORNEYS April 14, 1942. H. V. KINDSETH 2,279,328
BAG CLOSING AND SEALING MACHINE
Filed June 22, 1939 8 Sheets-Sheet 6
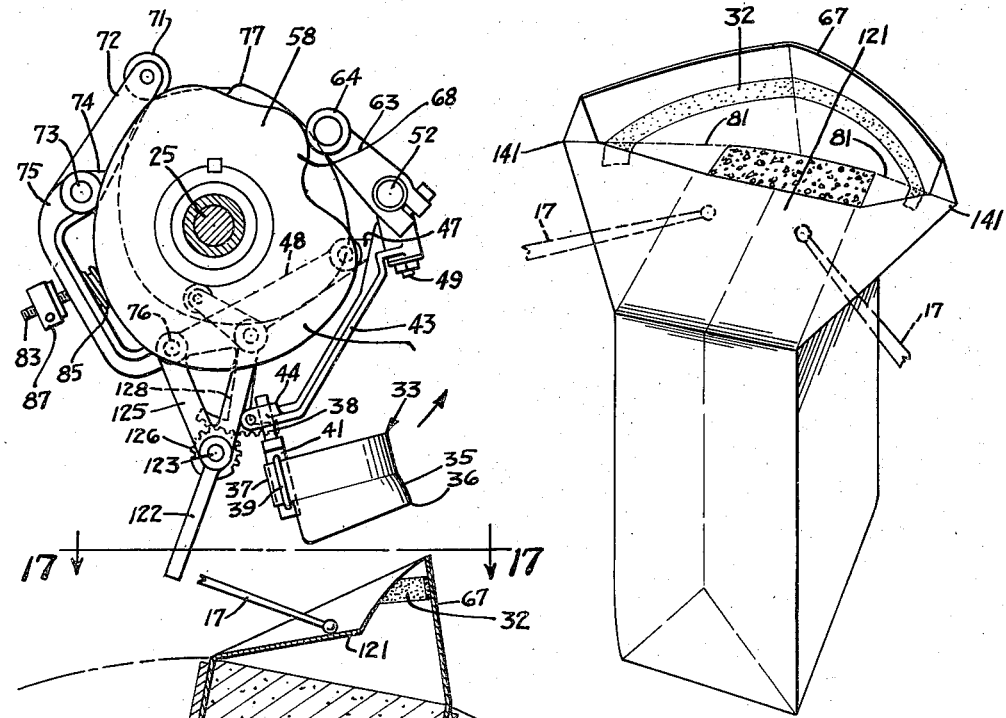
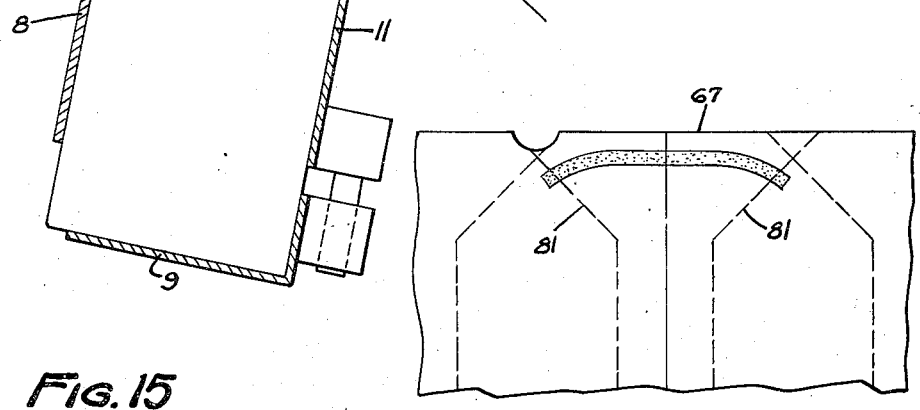
Fig. 15
Fig. 16
Fig. 20
INVENTOR
HAROLD V. KINDSETH
By Paul, Paul Moore Kirn
ATTORNEYS

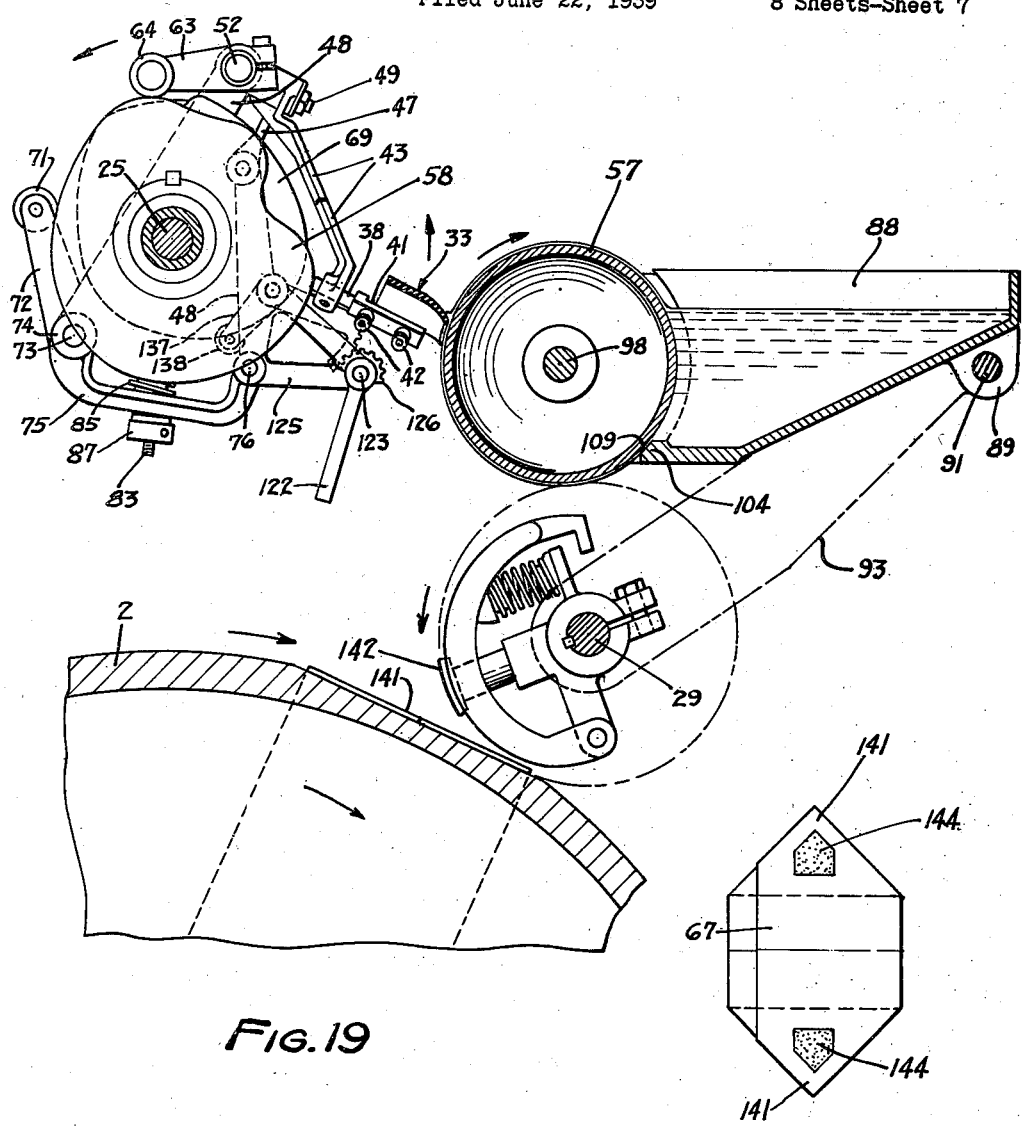

April 14, 1942.  H. V. KINDSETH  2,279,328
BAG CLOSING AND SEALING MACHINE
Filed June 22, 1939  8 Sheets-Sheet 8

INVENTOR
HAROLD V. KINDSETH
ATTORNEYS

Patented Apr. 14, 1942

2,279,328

UNITED STATES PATENT OFFICE 2,279,328

BAG CLOSING AND SEALING MACHINE

Harold V. Kindseth, Minneapolis, Minn., assignor to Bemis Bro. Bag Co., Minneapolis, Minn., a corporation of Missouri Application June 22, 1939, Serial No. 280,541

12 Claims. (Cl. 91—18)

This invention relates to new and useful improvements in bag closing and sealing machines and more particularly to a novel mechanism for applying the paste to certain areas of the bag top walls, prior to folding them into closing and sealing relation.

An object of the present invention is to provide a simple mechanism for applying a suitable adhesive to inner surfaces of the walls of an open bag mouth, said mechanism being adapted to apply the adhesive in the form of a narrow, elongated pattern, extending around substantially one-half the circumference of the open bag top, whereby when the bag top walls are folded into closing and sealing relation, said walls will be so sealed that sifting of the material from the closed bag tops is rendered substantially impossible.

A further object of the invention is to provide a pasting mechanism comprising a bendable element having means for inserting it into the open top of a bag and then extending it into contact with certain of the bag top walls, thereby to apply a suitable adhesive or gum thereto.

A further object is to provide an improved pasting mechanism applicable for use in connection with machines of the character disclosed in the patent to Daniel Belcher, No. 1,989,471.

A further object is to provide a pasting mechanism comprising a pair of oppositely disposed arms connected together for simultaneous operation and supporting at their outer ends, a flexible paste applicator, constructed of rubber, or some other suitable flexible material, means being provided for operating said arms, whereby when a bag passes beneath the pasting mechanism, the paste applicator will be inserted into the open bag top, wherein it is expanded into engagement with certain of the walls of the bag mouth, thereby to apply a suitable gum to certain surfaces of the bag top walls.

Other objects of the invention are to provide an improved bag top pasting mechanism comprising a flexible paste applicator having means for moving it into and out of an open bag top to apply a suitable adhesive to inner surfaces of the bag top walls, each time a bag passes beneath said mechanism; in the provision of a paste applicator which is extremely simple and inexpensive in construction and which is so arranged that the adhesive or gum is applied to inner surfaces of the bag mouth walls by direct pressure, whereby the gum may be applied to the surfaces of the bag top walls, in a predetermined pattern; in the means for moving the paste applicator into and out of engagement with the gum roll during each cycle of operation, whereby the applicator receives a fresh supply of gum for each bag; in the provision of means for engaging and partially inwardly folding the back wall of the bag mouth to facilitate folding the bag mouth walls into closing and sealing relation; and, in the general construction of the pasting mechanism, as a whole, which is simple in construction and may readily be applied to machines of the general character disclosed in the patent hereinbefore mentioned.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

In the drawings:

Figure 9 is a vertical sectional view substantially on the line 9—9 of Figure 2, showing the paste applicator entering a bag mouth;

Figure 10 is a view showing the open top of a bag with the paste applicator positioned in the bag mouth before being extended into engagement with the walls thereof;

Figure 11 is a view similar to Figure 10, showing the applicator extended into contact with the walls of the bag mouth;

Figure 12 is a view showing the open top of a bag after the gum has been applied to walls thereof;

Figure 13 is a plan view of the arms which support the paste applicator;

Figure 14 is a view similar to Figure 9, showing the paste applicator extended into engagement with the walls of the bag mouth;

Figure 15 is a view similar to Figure 14, showing the position of the parts, when the applicator leaves the bag mouth and the folding fingers engage and inwardly fold the rear wall of the open bag top;

Figure 16 is a perspective view of the bag shown in Figure 15, showing the inner gummed surfaces of the bag mouth walls;

Figure 17 is a view substantially on the line 17—17 of Figure 15;

Figure 18 is a view of the folding fingers moved out of engagement with the walls of the bag top;

Figure 19 is a view showing the flexible paste applicator engaging the glue roll to receive a fresh supply of gum for the next following bag;

Figure 20 is a fragmentary view showing the gummed portion of a bag top flattened out to more clearly illustrate the pattern or outline of the gummed area;

Figure 21 is a plan view of a bag with its top walls partially folded into closing relation, and showing gum applied to the flaps of the partially closed bag top;

Figure 22 is a perspective view showing a filled bag with its top completely closed and sealed;

Bag supporting and conveying means

Figure 1:
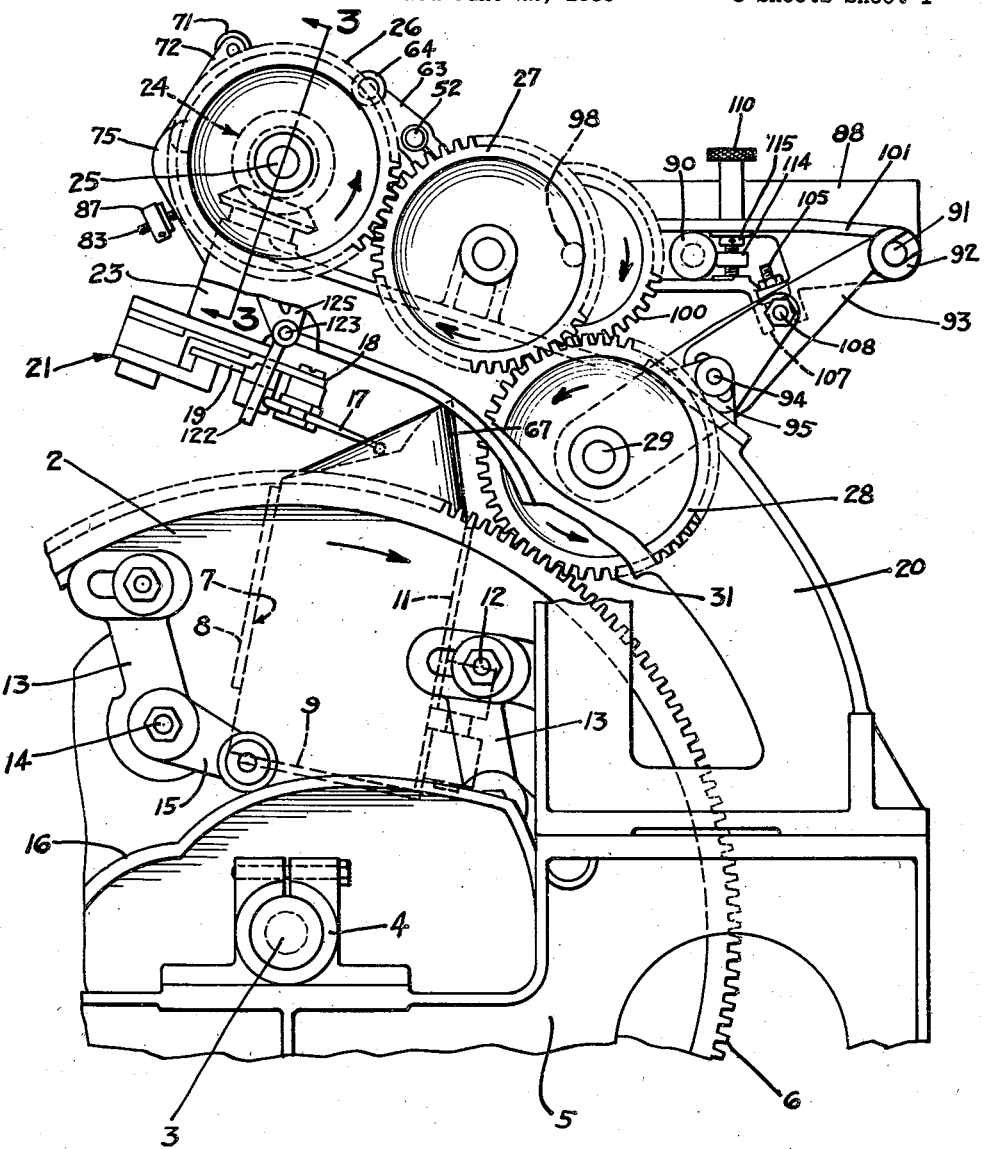
Figure 1 is a view showing a portion of a bag closing and sealing machine with the invention applied thereto.

The means for supporting and conveying the bags is similar to the machine disclosed in the above mentioned patent, and comprises a rotatable member 2 secured to a shaft 3 mounted in suitable bearings 4 provided in the main supporting frame 5 of the machine. The rotatable member 2 is shown provided with a suitable ring gear 6 which may be driven from a suitable source of power, not shown.

A plurality of bag supporting members or pockets, generally indicated by the numeral 7, are provided in the member 6, and each has a back wall 8, a bottom wall 9, and a front wall 11. The front wall 11 is secured to a stud 12 mounted in an arm 13. The arm 13 is pivoted to a stud 14 secured to the wall of the member 6. An arm 15 is connected to the arm 13 and has a roller adapted to engage a fixed cam 16, whereby the arm 13 is moved to operate the bottom and front walls 9 and 11 of the pocket 7 during rotation of the member 6. All of the above described parts are shown and described in detail in the patent of Daniel Belcher, hereinbefore referred to and it is therefore thought unnecessary to herein further describe them in detail.

Bag top closing mechanism

Figure 2:
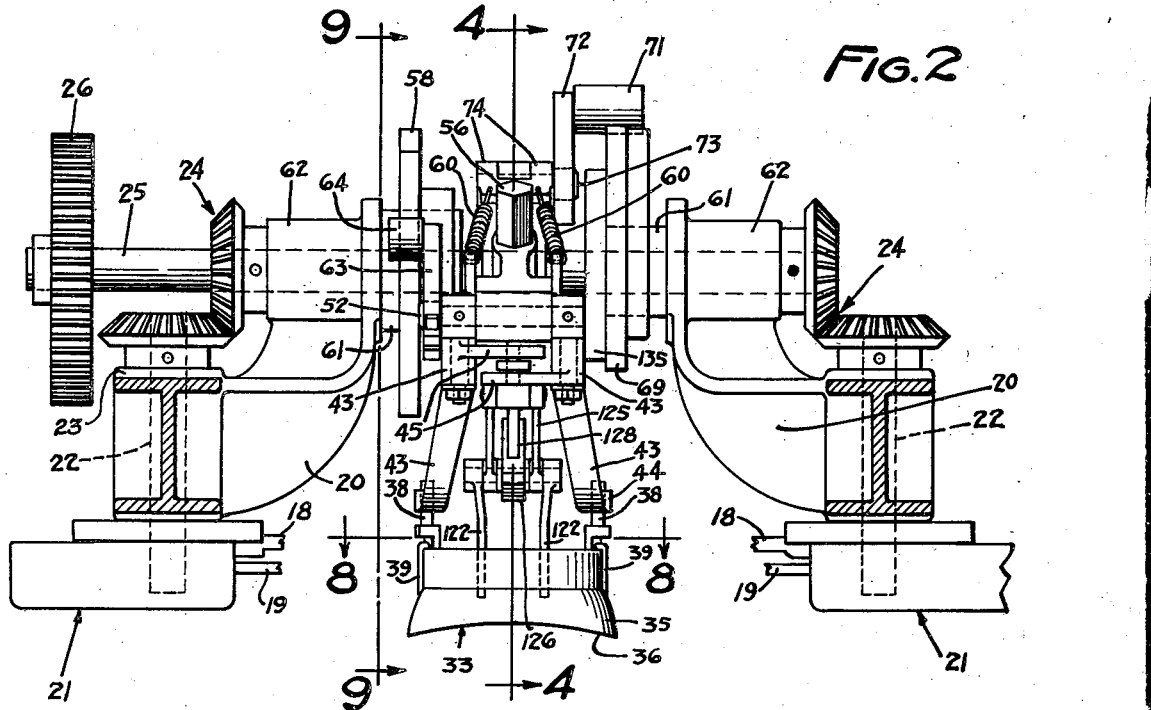
Figure 2 is a view substantially on the line 2—2 of Figure 4, showing the paste applicator partially contracted.

The bag top closing mechanism is similar to the corresponding structure disclosed in the above mentioned patent, and it is therefore described but briefly herein. It comprises a pair of oppositely movable fingers 17, each supported in arms 18 and 19 operatively mounted in suitable operating heads, generally designated by the numeral 21, as shown in Figures 1 and 2. The operating heads are secured to shafts 22 mounted in suitable bearings 23 provided at the upper ends of brackets 20, secured to the side members of the main frame 5, as shown in Figure 1. Suitable bevel gear drives 24 connect the shafts 22 to a cross shaft 25 having a gear 26 secured to one end thereof. The gear 26 is shown driven from an intermediate gear 27 which meshes with a gear 28 secured to a shaft 29, driven from the ring gear 6 by a gear 31.

The arms 18 and 19 of the heads 21 are mounted for rotary movement about the axes of the heads 21, whereby the folding fingers 17 operate in a plane which is perpendicular to the axes of the shafts 22 of the heads 21, as will be understood by reference to Figures 1 and 2.

Pasting mechanism

An important feature of the present invention resides in the novel means provided for applying paste to the walls of the bag top prior to folding them into closing and sealing relation. The mechanism employed for this purpose is so constructed that a strip of paste, generally indicated by the numeral 32, is applied to inner surfaces of the walls of the bag top in the form of an elongated narrow pattern disposed adjacent to the upper edge of certain of the bag top walls, as best shown in Figures 16 and 18. The strip extends substantially around one-half the circumference of the bag top, as clearly illustrated in Figures 12, 16, and 18.

Figure 4:
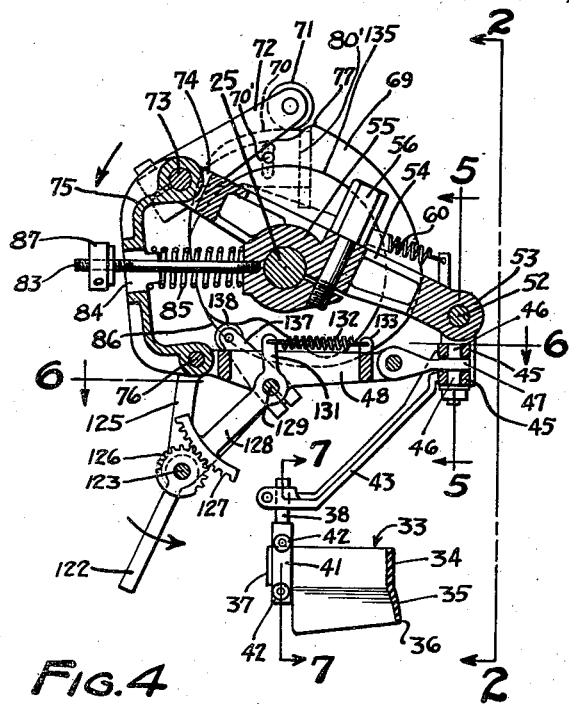
Figure 4 is a detail sectional view on the line 4—4 of Figure 2, showing the lever mechanism for operating the paste applicator and also the back wall breaker.
Figure 7:
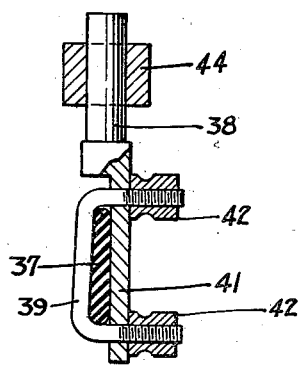
Figure 7 is an enlarged detail sectional view on the line 7—7 of Figure 4, showing the means for securing the paste applicator to its supporting means.

The paste is applied to the inner surfaces of the bag top walls by a paste applicator, generally designated by the numeral 33. This applicator is constructed of a flexible, bendable material such, for example, as rubber, and has an elongated body portion 34, provided with a depending skirt 35 which preferably tapers downwardly from the body 34 to substantially a knife edge 36, as best shown in Figures 4 and 9. The end portions 37 of the applicator 33 are removably secured to studs 38 by suitable clamps 39, the threaded ends of which are received in apertures provided in the strap-like end portions 41 of the studs 38, as best shown in Figure 7. Suitable nuts 42 are received in threaded engagement with the terminals of the clamps 39 to detachably secure the applicator to the studs 38.

Figure 6:
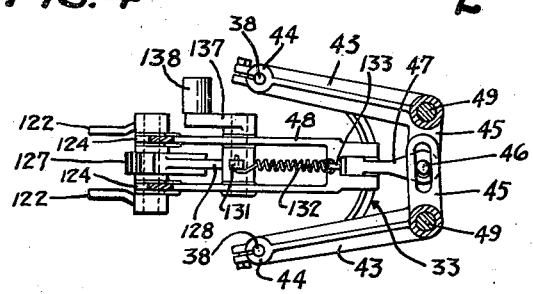
Figure 6 is a detail sectional view on the line 6—6 of Figure 4, showing the arms for supporting the paste applicator.

The applicator 33 is mounted for swinging movement around the axis of the shaft 25, and is supported by a pair of spreader arms 43 having split hubs 44 at their outer ends adapted to receive the studs 38 of the applicator, as best shown in Figure 6. The split hubs 44 of the arms permit the applicator to be relatively adjusted with respect to the arms 43 and also whereby the applicator, including the studs 38, may readily be detached from the machine, as will be understood by reference to Figures 6, 7, and 14.

The spreader arms 43 are provided with lateral arms 45 which are slotted to receive oppositely disposed projections 46 provided on one end of a link 47. The opposite end of the link 47 is pivotally connected to a connecting member 48, as clearly illustrated in Figures 4 and 6. The spreader arms 43 are mounted on studs 49 having heads 51 keyed to a shaft 52 rotatably mounted in a suitable bearing 53 provided at one end of a supporting arm 54. The supporting arm 54 has a central hub 55, bored to receive the shaft 25. The hub 55 is split, and a suitable lock screw 56 is provided for securely clamping the hub 55 to the shaft 25, to prevent relative rotation of the arm 54 thereon. The applicator 33, as hereinbefore stated, is mounted for swinging movement about the axis of the shaft 25. During such swinging movement, radial movement is imparted thereto at certain points in its travel for moving it into and out of the open bag top, and also to control its position with respect to the periphery of the paste feed roll 57, as best shown in Figure 19. Simultaneously as the paste applicator 33 travels around the shaft 25 in a vertical plane, the spreader arms are actuated at certain points in the travel of the spreader so that the applicator is contracted when it approaches the open bag top, as shown in Figure 9, whereby it may readily enter the open bag top, as shown in Figure 10. The applicator is then expanded into contact with the walls of the bag top, as shown in Figure 11, after which it is slightly contracted, to permit it to leave the open bag top, as shown in Figure 14, without smearing the paste to the edge of the bag top walls, as will subsequently be described.

Figure 3:
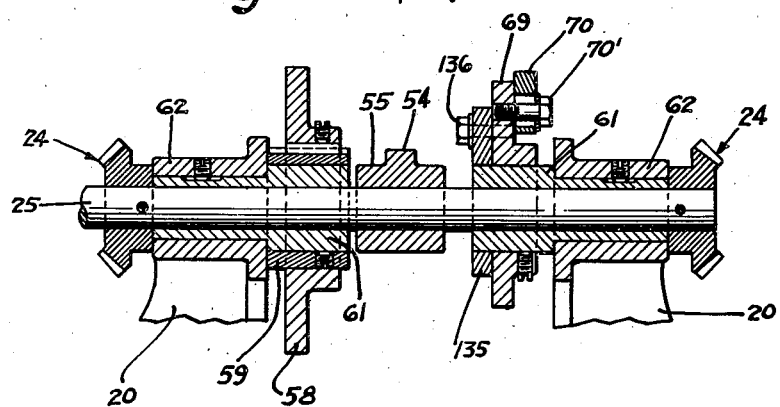
Figure 3 is a detail sectional view on the line 3—3 of Figure 1, showing the cams for operating the paste applicator.

The means for imparting radial movement to the applicator 33 with respect to the shaft 25 comprises a cam 58, shown adjustably secured to a sleeve 59 secured to a bushing 61 having one end received in the bore of a hub 62, as best shown in Figure 3. The bushing 61, supported in the hub 62 is bored to receive one end of the shaft 25 and thus provides a support therefor. The opposite end of the shaft 25 is supported in a similar bushing 61 secured in a hub 62 of the bracket 20 at the opposite side of the machine.

Figure 5:
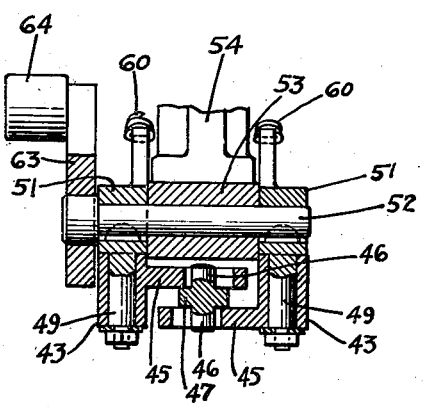
Figure 5 is a detail sectional view on the line 5—5 of Figure 4, on a larger scale.

An arm 63 is secured to one end of the shaft 52, as shown in Figure 5, and has a roller 64 adapted to engage the periphery of the cam 58, as clearly shown in Figures 2, 9, and 15. Springs 60 hold the roller 64 in engagement with the cam 58. The cam, it will be noted by reference to Figures 9 and 15, is provided with a low spot 65 in its periphery, which is so disposed that when the applicator 33 reaches a position substantially over the open top of the bag, the roller 64 will enter the low spot 65 of the cam, whereby the arms 43 are thrust outwardly from the position shown in Figure 9, to that shown in Figures 4 and 14, thereby inserting the applicator into the open top of the bag. It is to be understood that the bag top and the applicator are traveling in the same general direction, when they reach the positions shown in Figures 9 and 14, and as indicated by the arrows in these two figures. The movement of the applicator, however, is so timed with respect to the movement of the bag top, that the applicator will move into engagement with the leading wall 67 and portions of the side walls of the bag top, as shown in Figure 14, before the roller 64 engages the incline 68 of the cam 58, and moves the applicator out of the mouth of the bag top.

In order to insert the applicator 33 into the open bag top and remove it therefrom without contacting the walls of the bag top in such a manner as to smear the paste thereon, the applicator must be contracted to substantially a horseshoe shape, as shown in Figure 10, before it is inserted into the open bag top.

To thus contract or inwardly bend the ends of the applicator 33, to permit its insertion into the open bag top, a cam 69 is provided on the bushing 61, shown at the right hand side of Figure 3. The periphery of the cam 69 is engaged by a roller 71 mounted in one end of an arm 72, the opposite end of which is secured to a stub shaft 73 supported in spaced lugs 74 provided at the upper end of the supporting arm 54, as shown in Figure 4. An intermediate arm 75 is secured to the stub shaft 73 between the lugs 74, and depends therefrom and has its lower end pivotally connected to one end of the connecting member 48 by a suitable shaft 76. By this arrangement, it will be noted that each time the arm 72 is oscillated, movement will be imparted to the connecting member 48 which, because of its connection with the spreader arms 43 through the link 47, will cause the spreader arms to move inwardly or outwardly, depending upon the movement of the arm 72.

The periphery of the cam 69 has a high spot 77, which is so located that when the paste applicator 33 is about to enter the open bag top, as shown in Figure 9, the roller 71 of the arm 72 engages the high spot 77 of the cam, whereby the arms 43 are actuated to inwardly bend the ends of the paste applicator 33 to substantially the position shown in Figures 10 and 13. When the applicator is thus contracted, it may readily be inserted into the open bag top without contacting the side walls thereof. As soon as the applicator 33 has entered the open bag top, the roller 71 drops from the high point 77 of the cam 69, whereby the connection 48 is operated to spread the arms 43 so that the applicator 33 is expanded into contact with the walls of the bag top, as clearly illustrated in Figure 11. When thus positioned, the lower marginal edge of the skirt 35 of the applicator will engage inner surfaces of the bag top walls and apply a coating of paste thereto, as shown in Figure 14. When the applicator reaches substantially the position shown in Figure 14, the roller 64 of the arm 63 engages the abrupt incline 68 of the cam 58, whereby the spreader arms 43 are swung inwardly from the position shown in Figure 14 to that shown in Figure 9, so that the bag may pass on without further contact with the paste applicator.

Means is provided for controlling the maximum spread of the arms 43, to accommodate different sizes of bag tops. To thus control the spread of the arms 43, the cam 69 may be provided with an adjustable section 70, mounted for radial adjustment whereby the drop from the high point 77 of the cam 69 may be varied. The section 70 is shown secured in adjusted position by a suitable screw 70'. Suitable means, such as a tongue and groove, generally indicated at 80' in Figure 4, may be provided to guide the section 70 in a radial path.

To remove the paste applicator from the open bag top, after gumming the walls thereof, it is necessary that the paste applicator be partially contracted so that it will disengage the walls of the bag top and move out of the bag top without smearing the paste over relatively large surfaces of the bag top walls. This partial contraction of the paste applicator is conveniently accomplished by the unique design of the cam 58, which is such that when the incline 68 thereof is suddenly engaged by the roller 64, the force exerted on the hubs of the arms 43 by the studs 49 to swing said arms inwardly, will cause the arms to slightly rotate on the studs 49 because of the resistance exerted against the inwardly extending arms 45 thereof by the link 47. It will thus be seen that the periphery of the cam 58 is so constructed that in addition to imparting radial movement to the applicator to move it into and out of the open bag top, it also serves to partially contract the applicator at the instant its withdrawal from the open bag top is started, whereby the applicator cannot smear the paste beyond predetermined areas of the bag top walls.

This is an important feature of the invention in that it makes it possible to apply the paste to the inner surface of the bag top walls in an elongated, narrow, unbroken pattern, extending substantially one-half the distance around the circumference of the open bag top, as clearly illustrated in Figure 12. It will also be noted, by reference to Figure 20, which shows the gummed portions of the bag top walls flattened out, that the pasted area curves slightly downwardly at each end, and also intersects the fold lines 81, which are formed when the bag top walls are subsequently folded inwardly over the contents of the bag body, as shown in Figure 16. By thus applying the paste to inner surfaces of the bag top walls, when opposite walls of the bag top are folded inwardly, one over the other, as shown in Figure 18, the gummed area will extend the full length of the outwardly extending portions of the bag top walls, whereby these wall portions are so firmly united together that it is practically impossible for any of the contents of the bag to sift through the sealed top thereof.

Means is provided for controlling the spread of the arms 43 and, as best shown in Figure 4, comprises a stem 83 having one end secured to the hub 55 of the arm 54, and its other end passing through an opening 84 in the intermediate arm 75. A spring 85 is coiled about the rod 83 and has one end seated against the hub 55 and its opposite end against the arm 75, whereby it constantly urges the arm 75 in a direction away from the hub 55. Such action of the spring 85 tends to hold the roller 71 of the arm 72 against the periphery of the cam 69.

The cam 69, however, is provided with a low side 86 which is such that the spring 85 will force the intermediate arm 75 into engagement with an adjusting nut 87 mounted on the end of the rod 83. When the arm 75 engages the adjusting nut 87, the arms 43 may be substantially in the position indicated by the dotted lines in Figure 8, whereby it is to be noted that the paste applicator 33 is extended or expanded to substantially its full length. The degree of expansion of the paste applicator may be controlled by manipulation of the adjusting nut 87, which limits the movement of the intermediate arm 75.

*Paste supply means*

Figure 23:
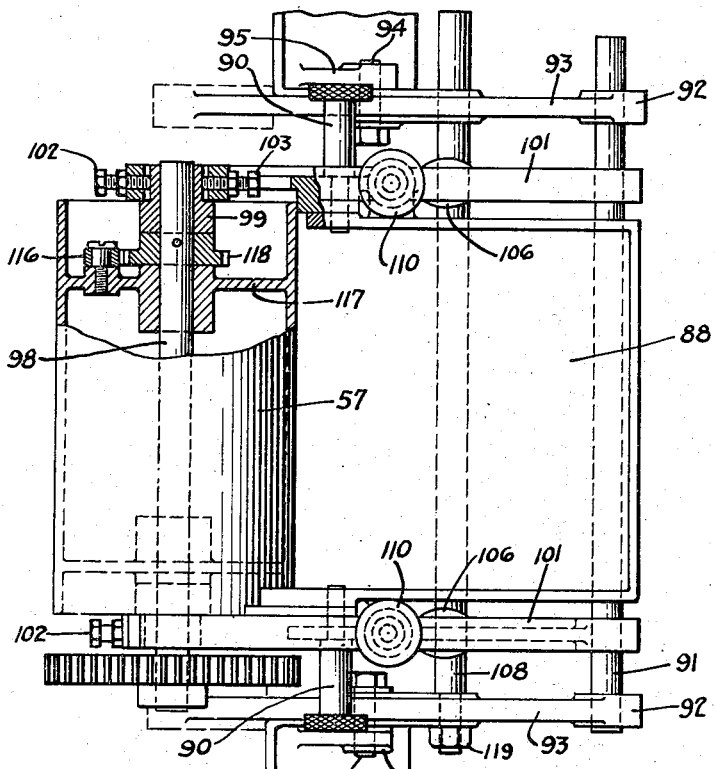
Figure 23 is a plan view of the paste container and feed roll.
Figure 24:
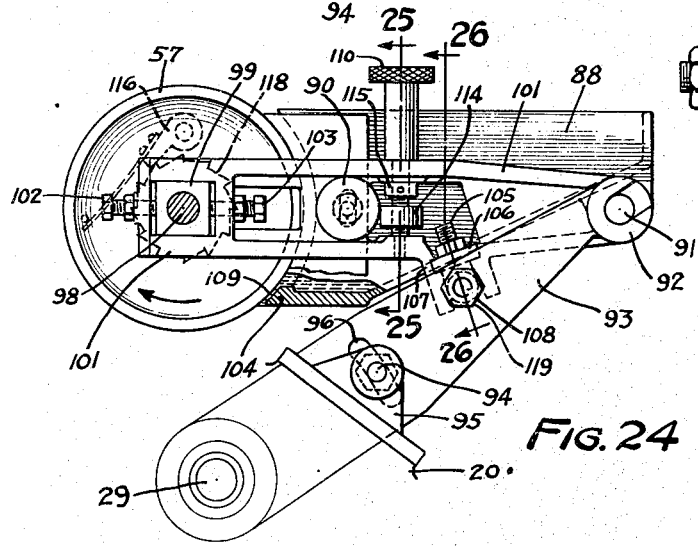
Figure 24 is a side view of the paste container and feed roll.

The paste supplying means is best shown in Figures 19 and 23 to 26, inclusive. It comprises a pan or container 88 having lugs 89 at one end apertured to receive a rod 91, the ends of which are removably supported in the forked ends 92 of a pair of arms 93 having their lower ends mounted on the shaft 29, as shown in Figures 1 and 24. The arms 93 are pivotally supported on the shaft 29 and are secured in adjusted position by clamping screws 94 having their terminals received in threaded engagement with suitable brackets 95 secured to the side brackets 20 of the machine frame. The arms 93 are provided with slots 96 for receiving the clamping screws 94. The slots 96 provide means whereby the entire paste feeding mechanism, shown in Figure 24, may be rotatively adjusted about the axis of the shaft 29 and with respect to the paste applicator operating mechanism, shown in Figure 19.

The paste pan 88, as shown in Figure 19, has an inclined bottom, open at one end, as shown in Figure 19. A paste feed roll 97 is rotatably mounted on a shaft 98 supported in bearing blocks 99, adjustably supported in the ends of a pair of arms 101. Suitable adjusting screws 102 and 103 provide means for adjusting the position of the feed roll 97 with respect to the paste pan 88, whereby the gap between the lower edge 104 of the paste pan and the periphery of the feed roll 97, may be varied, so that the film of paste conveyed from the paste pan by the periphery of the feed roll 97, may be controlled. The shaft 98 of the paste feed roll 97 is driven by a gear 110, secured to the shaft 98 and meshing with the gear 31, shown in Figure 1.

The opposite ends of the arms 101 are pivotally mounted on the shaft 91, and the angular relation between the arms 93 and 101 may be varied by manipulation of an adjusting screw 105, received in threaded engagement with a lug 106 provided in a depending portion 107 of the arm 101. The terminal of the adjusting screw 105 is engaged with a cross rod 108, which ties together the arms 93 as will readily be understood by reference to Figures 23 and 26. It will be noted that the downwardly extending portions 107 of the arms 101 are forked to receive the rod 108. These forks are disposed at such an angle that the outer ends of the arms 101 which carry the paste feed roller 57, may readily be adjusted up and down by manipulation of the set screws 105.

Means is also provided for vertically adjusting the end portion of the paste pan adjacent to the feed roll 57, whereby the inclined contact surface 109 of the lower wall of the paste pan may be so positioned with respect to the periphery of the feed roll 57, as to accurately control the thickness of the paste film conveyed by the periphery of the feed roll.

Figure 25:
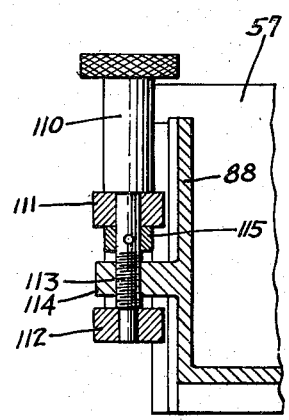
Figure 25 is a detail sectional view on the line 25—25 of Figure 24, showing the means for adjusting the paste pan to control the supply of paste to the paste applicator.
Figure 26:
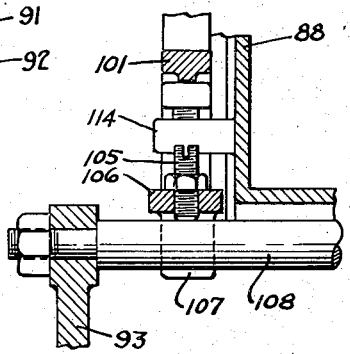
Figure 26 is a detail sectional view on the line 26—26 of Figure 24, showing the means for adjusting the paste roll with respect to the paste dauber.

The means provided for thus varying the gap between the inclined edge 109 of the paste pan and the periphery of the feed roll, is clearly shown in Figures 24 and 25, and comprises adjusting screws, generally indicated by the numeral 110. These adjusting screws are rotatably supported in spaced lugs 111 and 112 of the arms 101. The portions 113 thereof are threadedly engaged with lugs 114 provided on the side walls of the paste pan 88. Suitable collars 115 may be provided on the adjusting screws 110 below the upper lugs 111, to prevent axial movement of the screws 110. By rotation of the screws 110, it will readily be noted that the front inclined edge 109 of the paste pan 88 may be relatively adjusted with respect to the periphery of the feed roll 57. Locking screws 90 are provided for securing the paste pan in adjusted position in the arms 101.

*Paste roll driving means*

The means for driving the paste roll is best shown in Figures 23 and 24, and comprises a spring-actuated dog 116, shown pivotally mounted on the end wall 117 of the paste feed roll 57. The dog 116 is adapted to engage a ratchet wheel 118 secured to the shaft 98. The shaft 98, upon which the paste feed roll 57 is mounted, is supported in the bearing blocks 99 provided in the arms 101. A gear 100 is secured to the shaft 98, and meshes with the gear 31, secured to the shaft 29, shown in Figure 1. It will thus be noted that upon normal operation of the machine, the paste feed roll 57 will rotate continually, whereby the paste applicator may receive a fresh supply of gum therefrom for each revolution of the paste applicator about the shaft 25.

The paste applying mechanism may readily be removed from the machine, as a unit, by simply releasing the nuts 119, after which the arms 101, feed roll 57 and paste pan 88 may readily be swung upwardly so that the cross rod or shaft 91 may be moved out of engagement with the forked ends 92 of the arms 93, thereby to permit removal of the paste pan and said roll from the apparatus.

*Auxiliary folding means*

To assure that the walls of the open bag top will be accurately folded into closing and sealing relation by the main folding fingers 17, a pair of auxiliary folding fingers 122 are arranged to engage and inwardly fold or "break" the rear wall 121 of the open bag top in advance of the folding fingers 17. The auxiliary folding fingers 122 are best shown in Figures 4, 6, 9, 14 and 19. They are secured to a short shaft 123 mounted in bearings 124 provided in a depending bracket 125, shown secured to the connecting member 48. A partial pinion 126 is secured to the shaft 123, and meshes with a gear segment 127 provided on an arm 128 secured to a shaft 129 which, in addition, serves to support one end of the bracket 125. The arm 128 has an upstanding lug 131 to which one end of a spring 132 is connected. The opposite end of the spring may be connected to a lug 133 provided on the connection 48. The spring 132 constantly urges the shaft 129 in a direction to rotate the gear segment 127 in such a manner as to swing the auxiliary fingers 122 in the direction indicated by the arrow in Figures 4 and 14, whereby they will engage and inwardly fold or "break" the rear wall 121 of the open bag top, as will readily be understood by reference to Figure 14. The auxiliary fingers 122 are operated by a cam 135 shown mounted on the bushing 161 adjacent to the cam 69 and secured thereto by a bolt 136. An arm 137 is secured to the shaft 129 and has a roller 138 engaging the periphery of the cam 135, as clearly illustrated in Figures 4 and 14.

The cam 135 is so designed that when the auxiliary folding fingers 122 are rotated around the axis of the shaft 25, the fingers 122 will be operated to initially inwardly fold or "break" the rear wall 121 of the open bag top, as hereinbefore stated. The operation of the auxiliary fingers is so timed with respect to the travel of the spreader arms 43 of the paste applicator that when the paste applicator enters the open top of the bag, as shown in Figure 9, the fingers 122 will be about to descend against the rear wall 121 of the bag top and inwardly bend or fold it, as shown in Figure 14. Such initial inward bending or "breaking" of the rear wall 121 of the open bag top, before the main folding fingers 17 engage said wall, results in the walls of the open bag top accurately folding into closing and sealing relation, when subsequently engaged by the main folding fingers 17, whereby the closed top will be neatly formed, as shown in Figures 18 and 22.

In some instances, it may be found desirable to dispense with the auxiliary folding fingers 122, in which case, they may readily be detached from the machine by removing the shafts 76 and 129, which will permit the removal of all of the parts associated therewith.

*Operation*

In the operation of the apparatus, the machine is adjusted for the particular size of the bag to be closed, after which the bags are delivered into the pockets 7 of the rotor 2 from any suitable source, such as a bag shaker, not shown in the drawings. As the bags pass beneath the shaft 25, the paste applicator will enter the open top of each bag, as shown in Figure 10, after which it is expanded to the position shown in Figure 11, thereby to contact the walls of the bag top, as shown in Figure 14. The applicator 33 is then slightly contracted, as hereinbefore stated, as a result of the roller 64 engaging the abrupt incline 68 of the cam 58, whereby the applicator is moved out of the open top of the bag without smearing the paste on the wall surfaces thereof.

Figure 8:
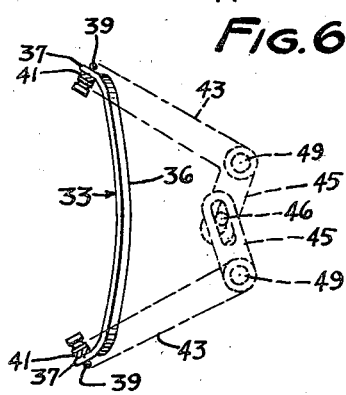
Figure 8 is a detail sectional view substantially on the line 8—8 of Figure 2, showing the flexible paste applying element extended.

As the paste applicator continues in its circular path around the shaft 25, and immediately following its withdrawal from the open bag top, as shown in Figure 15, the arms 43 are spread outwardly by the cam 69, to substantially the position indicated in dotted lines in Figure 8, whereby the applicator 33 is extended so that its lower edge will engage the periphery of the paste feed roll 57 with a wiping action, as shown in Figure 19, whereby the applicator will receive a fresh supply of paste. It is to be understood that the paste applicator travels in the same direction as the periphery of the paste feed roll 57, when it engages it, as shown in Figure 19. The peripheral speed of the paste applicator 33 is preferably slightly faster than the peripheral speed of the paste roll, whereby a slight wiping action is obtained as the flexible edge 35 of the applicator 33 engages the periphery of the feed roll.

The ratchet drive for the paste roll, including the ratchet wheel 118 and pawl 116, permits the rotor and all of the operating parts driven thereby to be reversed when necessary, without causing a reverse rotation to the paste feed roll 57. This is highly desirable in that it prevents the paste roll 57 from carrying a surplus of paste from the paste pan, which it might do if permitted to rotate in a counter-clockwise direction, when viewed as shown in Figure 19, should the rotor 2 be reversed.

After the walls of the bag top have been folded into flatwise relation, as shown in Figure 18, additional paste is applied to the upper faces of the oppositely extending flaps 141, by a suitable paste dauber 142, mounted on the shaft 29 and adapted to receive paste from the periphery of the feed roll, as the paste receiving surfaces of the dauber 142 passes the paste roll. The paste is applied to the flaps 141, as indicated at 144 in Figure 21, so that when the flaps are folded inwardly over the top of the bag body, the one will be secured to the previously folded bag top walls, and the last folded flap will be secured to the first folded flap, as will readily be understood by reference to Figure 22. The paste dauber and its operating mechanism is clearly shown and described in the patent hereinbefore mentioned, and it is therefore thought unnecessary to herein describe the same in detail.

I claim as my invention:

1. In a bag closing and sealing machine, means for supporting a filled bag, a bendable paste applicator, opposed pivoted arms to which the ends of the applicator are connected, a movable support for said arms, and cam means for actuating said arms to insert the paste applicator into an open bag top and expanding it into engagement with inner surfaces of the bag top walls, thereby to apply a coating of paste thereto, said coating of paste being applied in the form of a narrow elongated pattern extending substantially around one-half the circumference of the bag top.

2. In a bag closing and sealing machine, means for advancing the filled bags, a mechanism for applying paste to inner surfaces of the bag top walls, comprising a pair of oppositely movable arms, a rotary support for said arms, and a flexible paste applying element having its ends secured to said arms whereby swinging movement of the arms in one direction, will contract the element for insertion into the open top of a bag, and movement of said arms in the opposite direction, extending or expanding said element into engagement with the walls of the bag top.

3. In a bag closing and sealing machine, means for supporting a filled bag, a flexible, rubber paste applying element, and means connected to the ends of said element and operable to inwardly bend the ends thereof and insert it into an open bag top and expand it into engagement with a bag top wall, whereby a coating of paste is applied to said wall in the form of an elongated pattern.

4. In a bag closing and sealing machine, means for supporting a filled bag, a bendable paste applicator, and pivoted arms connected to the ends of the applicator to provide a support therefor, a movable support for said arms, and means associated with said support for actuating said arms, first to bend and insert the applicator into an open bag top and thereafter to expand it into engagement with the walls of the open bag top, thereby to apply a coating of paste thereto, which coating of paste is applied in the form of a narrow elongated pattern extending substantially around one-half the circumference of the bag top.

5. In a bag closing and sealing machine, movable means for conveying the filled bags, a flexible paste applicator positioned over the path of travel of the bags, and means for contracting said applicator and inserting it into the open top of each bag and thereafter expanding it into engagement with the walls of the bag, thereby to apply a coating of paste thereto.

6. In a bag closing and sealing means, means for supporting a filled bag, a strap-like, bendable element having a flexible edge, a pair of arms having swingable ends to which the ends of said element are secured, a rotary support for the arms, and means associated with said support adapted to operate said arms to first inwardly bend the ends of the element whereby it may readily be inserted into the open top of a bag, and thereafter expanding the element to cause its flexible edge to contact the walls of the bag mouth and apply a suitable paste thereto in the form of a narrow elongated pattern.

7. In a bag closing and sealing machine, means for advancing filled bags, a bendable paste applicator, a pair of pivoted arms to the swingable ends of which the ends of the paste applicator are secured, a rotary support for said arms operating in timed relation to the bag advancing means, and means for operating said arms to insert the paste applicator into the open top of each bag and thereafter expand it into engagement with certain of the bag top walls to apply a coating of paste to said walls, prior to the folding of the bag top walls into closing relation.

8. In a bag closing and sealing machine, means for advancing filled bags, bag top closing means comprising a flexible paste applicator, interconnected arms supporting the ends of said applicator, means for swinging said arms towards and away from each other, whereby the applicator may be contracted to permit insertion into an open bag top, and means for operating said arms to extend the applicator into engagement with inner surfaces of the walls of each bag top, thereby to apply a coating of paste thereto, prior to closing the bag top.

9. In a bag closing and sealing machine, means for conveying filled bags over a predetermined path, a pasting mechanism comprising an elongated flexible paste applicator, a pair of oppositely movable arms connected to the ends of the applicator, a rotary support for said arms adapted to move the applicator into and out of an open bag top, cam means associated with said support for contracting the paste applicator, each time it approaches an open bag top, and means for expanding the applicator into engagement with the walls of the bag top when received therein, whereby a coating of paste is applied thereto in the form of an elongated, narrow pattern.

10. In a bag closing and sealing machine, bag advancing means, bag top closing means comprising a flexible paste applicator, interconnected arms connected to the ends of the applicator, a rotary support for said arms, means for operating said arms, when the support is rotated, whereby each time the applicator approaches an open bag top, the arms are operated to contract the applicator to permit it to enter the open bag top, after which said arms are operated to expand the applicator into contact with a wall of the bag top to apply paste thereto, and means for supplying paste to the applicator.

11. In a bag closing and sealing machine, a movable support for a filled bag, a flexible paste applicator mounted over the path of travel of the bag, a paste roll, a rotary support for the applicator, means associated with said support adapted to expand the applicator when it passes the paste roll, whereby the major portion of the length of the applicator will receive a supply of paste, means for contracting the applicator when it approaches the open bag top, whereby it may be inserted therein, means for momentarily expanding the applicator into engagement with the bag top walls when received in the open bag top, and means for partially contracting the applicator to permit its removal from the open bag top.

12. In a bag closing and sealing machine, a movable support for the bag, a paste applicator mounted over the path of travel of the bags, a paste supply device, a rotary support for the applicator comprising a shaft having a supporting member secured thereto, a pair of arms pivotally mounted on said member and having the ends of the paste applicator detachably secured to the ends thereof, cam means for operating said arms in opposite directions, whereby the applicator may be extended or contracted, means for imparting radial movement to the applicator when it approaches an open bag top whereby it may be inserted into the open bag top to apply a coating of gum to certain of the walls thereof, said cam means operating to first contract the paste applicator, as it approaches the open bag top, to permit it to enter therein without contacting the walls of the bag, and thereafter temporarily expanding the applicator into contact with the bag walls to apply paste thereto, after which the applicator is partially contracted to permit its removal from the open bag top without smearing the paste, said applicator being adapted to receive a fresh supply of paste from said paste supply device for each cycle of operation.

HAROLD V. KINDSETH.